United States Patent [19]

Peckels et al.

[11] Patent Number: 5,186,326
[45] Date of Patent: Feb. 16, 1993

[54] INJECTION MOLDED THERMOPLASTIC MEASURING SCALE HOLDER

[76] Inventors: Arganious E. Peckels, R.R. 2, Box 489; Timothy S. Peckels, R.R. 2, Box 747; both of Ogilvie, Minn. 56358

[21] Appl. No.: 543,030

[22] Filed: Jun. 25, 1990

[51] Int. Cl.⁵ .................................................. A45F 5/02
[52] U.S. Cl. ..................................... 206/234; 206/305; 206/371; 206/37; 224/252; 224/245; 224/904
[58] Field of Search ................ 206/305, 371, 38, 234, 206/37; 224/252, 245, 242, 253, 232, 904, 274, 277; 383/36; 141/331

[56] References Cited

U.S. PATENT DOCUMENTS

| | | | |
|---|---|---|---|
| 597,035 | 1/1898 | Tebbutt | 224/904 X |
| 860,081 | 7/1907 | Converse | 141/331 |
| 1,148,369 | 7/1915 | Farmer | 224/242 |
| 1,553,066 | 9/1925 | Burger | 224/242 |
| 2,036,845 | 4/1936 | Young | 383/36 |
| 2,640,596 | 6/1953 | Reeder | 224/277 X |
| 2,797,935 | 7/1957 | Carney | 224/277 |
| 3,381,807 | 5/1968 | De Vaughn | 224/232 X |
| 3,442,314 | 5/1969 | Muller | 206/305 |
| 4,303,188 | 12/1981 | Calabrese | 224/253 |
| 4,580,347 | 4/1986 | McKnight | 224/252 X |
| 4,700,840 | 10/1987 | Haddock | 206/37 X |
| 5,016,796 | 5/1991 | Johnson | 224/245 |

FOREIGN PATENT DOCUMENTS 125251  4/1928  Switzerland .

Primary Examiner—Paul T. Sewell
Assistant Examiner—Jacob K. Ackun, Jr.
Attorney, Agent, or Firm—Henry C. Kovar

[57] ABSTRACT

An injection molded thermoplastic holder for a metal measuring scale has an elongate tubular body of rectangular cross-section, a very slender internal scale pocket precisely sized to receive and protectively store and release the scale in a slip-fit relationship, air vent apertures at the bottom and along the length of the pocket, an integral molded plastic spring detent for frictionally holding the scale in the pocket, and a funnel to guide the scale into the pocket. An optional writing instrument is provided under the funnel and alongside the pocket. A new method of molding the unique scale holder with its elongate slender pocket is provided.

22 Claims, 2 Drawing Sheets

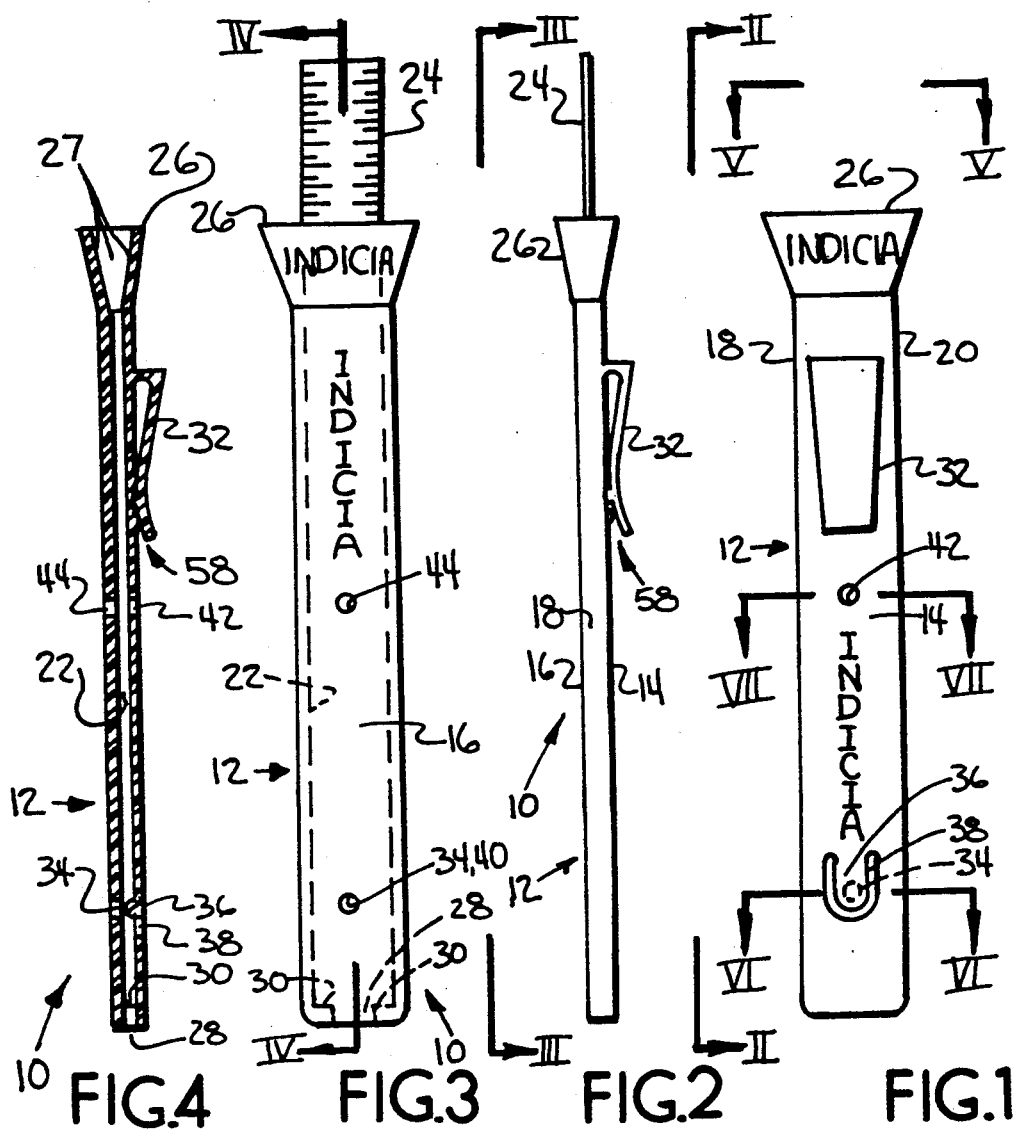

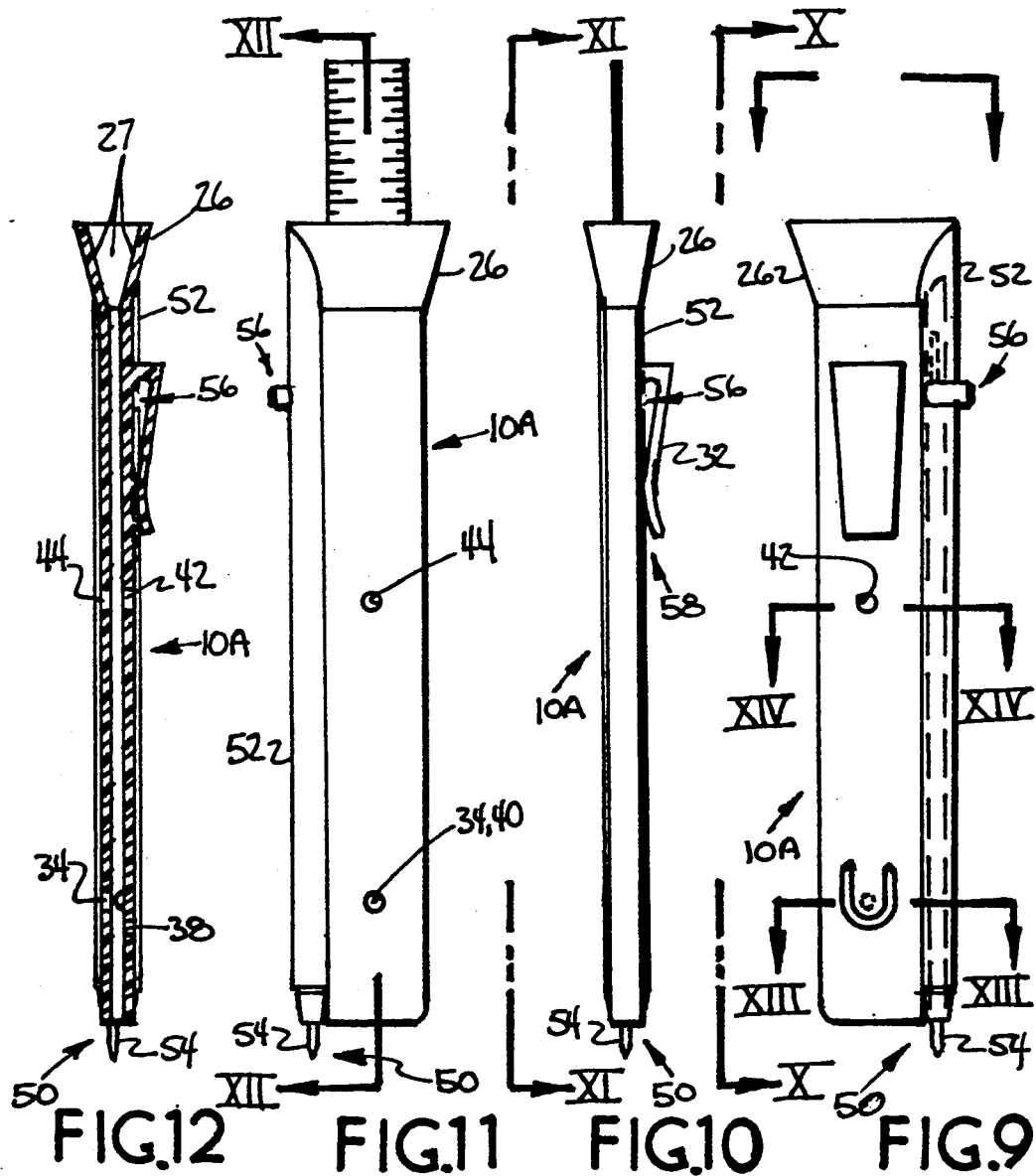

INJECTION MOLDED THERMOPLASTIC MEASURING SCALE HOLDER

BACKGROUND OF THE INVENTION

1. Field of the Invention

This invention pertains to a new and improved injection molded plastic holder for a metal measuring scale, and to a method of molding such a holder.

2. The Prior Art

The common 6 inch flat metal measuring scale is commonly carried by engineers, designers, draftsmen, machinists, and all of the trades that work with machines and structures.

These scales are typically carried in a chest level pocket in a fabric shirt or apron. The scales have quite sharp corners and will usually poke through the fabric pockets and will also soil the pockets during use.

There are two commonly used scale holders. The first is a leather holder having a crimped metal bead around its edges. The second is a heat or sonic welded flexible sheet plastic pocket liner which is seen in both narrow and full width versions. The full width version is also used for pencils and pens.

None of these are a high quality product, but merely are a functional necessity and are the least costly protection available.

OBJECTS OF THE INVENTION

It is an object of this invention to provide a new and improved measuring scale holder of injection molded plastic.

It is an object of this invention to provide a new method for making an injection molded plastic measuring scale holder.

It is an object of this invention to provide a new design for a molded plastic measuring scale holder.

SUMMARY OF THE INVENTION

An injection molded thermoplastic measuring scale holder has an elongate tubular body having a rectangular cross-section and an internal scale pocket having a thin, wide and long size Lo slip-fit accept a metal measuring scale, an inlet guide, a scale stop in an open bottom of the pocket, and at least one core fixing aperture through the body.

A design for an injection molded measuring scale holder has a body, an inlet, and an elongate length of generally rectangular section with core apertures to the scale pocket.

A method of manufacturing an injection molded one-piece thermoplastic measuring scale holder has the steps of providing a mold with an elongate cavity of rectangular cross-section, providing a thin measuring scale-like blade in the cavity, supporting the blade on both ends, coring into the cavity and supporting the blade, injection molding about the blade, and forming an integral scale retainer detent at least partially in the blade.

BRIEF DESCRIPTION OF THE DRAWINGS

FIG. 1 is a rear elevational view of the preferred embodiment of the measuring scale holder of the present invention;

FIG. 2 is a side view of FIG. 1; the side views being mirror images of each other;

FIG. 3 is a front elevational view of the structure of FIG. 1;

FIG. 4 is a sectional view through lines IV—IV of FIG. 3;

FIG. 5 is a top plan view;

FIG. 6 is a cross-section plan view through lines VI—VI 1;

FIG. 7 is a cross-section plan view through lines VII—VII of FIG. 1;

FIG. 8 is a bottom plan view from lines VIII—VIII in FIG. 1;

FIG. 9 is a rear elevational view of an alternative preferred embodiment of the measuring scale holder according to the present invention;

FIG. 10 is a side view of The structure of FIG. 9 from lines X—X;

FIG. 11 is a front elevational view of the structure of FIG. 9;

FIG. 12 is an elevational sectional view through lines XII—XII;

FIG. 13 is a sectional plan view through lines XIII—XIII;

FIG. 14 is a sectional plan view through lines XIV—XIV;

FIG. 15 is a bottom plan view of the structure of FIG. 9, the top plan view of the structure of FIG. 9 being identical to FIG. 5;

FIG. 16 is a top view of the retractor in the structure of FIG. 9;

FIG. 17 is a side view of the structure of FIG. 16; and

FIG. 18 is an end view of the structure of FIG. 16

DESCRIPTION OF THE PREFERRED EMBODIMENT

The preferred embodiment of a new and improved measuring scale holder is shown in the drawings and generally designated by the numeral 10. The new holder 10 is injection molded thermoplastic and is preferrably of a single integral piece of rigid thermoplastic that has been injection molded in a single mold shot with no subsequent assembly operations other than application of promotional copy as will be explained.

The holder 10 has an elongate tubular body 12 that has a back side 14, a front side 16, a right side 18 and a left side 20. The four sides 14, 16, 18, 20 have a generally rectangular cross-section as shown in FIGS. 6, 7 and 8 with each side 14, 16, 18, 20 preferrably being of the same thickness. Within the sides 14, 16, 18, 20 is an elongate straight internal measuring scale pocket 22 which is also generally rectangular in cross-section and has a specific cross-section as shown in FIGS. 4, 6, and 7 which is relatively thin and wide and which i slip-fitted about and slip-fit receptive of a typical flat metal measuring scale 24. The typical scale 24, as seen and used in the U.S., is 6 inches (150 mm) long, 0.020 inches (0.50 mm) thick, and 0.470 inches (12.0 mm) wide. The pocket 22 has a preferred cross-section size of 0.025 to 0.030 inches (0.62 to 0.75 mm) thick by 0.500 inches (12.5 mm) wide which freely accepts the scale 24 and enables the typical aforesaid scale 24 to freely slip in and out of the pocket 22 in a precise slip-fit relationship. The pocket 22 has a generally uniform thickness within the maximum range of 0.020 to 0.060 inches (9.5 to 1.5 mm). The holder 10 has a preferred elongate length of about five inches (125 mm) which leaves the top one inch (25 mm) or so of the scale 24 showing and available for manual grasping. The funnel 26 is about ½ inch (12.5 mm) high and the pocket 22 has a preferred height or length of at least four inches (100 mm) and is preferably in the range of 4–5 inches (100–125 mm) long for receiving the majority of the metal scale 24.

At a top and inlet end of the pocket 22 is a funnel structure 26 for guiding the scale 24 into the pocket 22. The funnel 26 extends outward of all four sides 14, 16, 18, 20 and also functions to hold the exposed end of the scale 24 off of adjacent structure. In particular and as a specific exmple, the back side of the funnel 26 will hold the scale 24 off of a shirt fabric. The funnel 26 also has internal scale guiding surfaces 27 extending to each side and forward of the pocket 22.

At the bottom of the body 12 and pocket 22 is a pocket opening aperture 28 from the pocket 22 and through the body 12 to the outside, for passage of air in and out of the Pocket 22 as the scale 24 is inserted and removed. On each transverse side of the preferred central opening aperture 28 is a scale stop formed by at least one and preferrably a pair of upward facing ledges 30 in each side of the pocket 22. The ledges 30 stop and support the scale 24 and also solidify the geometric shape of the pocket 22 and the tubular body 12. The ledge 30 and aperture 28 could be side-by-side or of other configuration.

On the back side of the body 12 is an integral plastic spring clip 32 for holding the holder 10 in a shirt or fabric Pocket, or on a Piece of sheet metal or other structure. The clip 32 is cored from the side during molding.

Near the bottom end of the body 12, and just above the ledges 30 is a plastic scale retainer detent 34 which protrudes into the pocket 22 to frictionally engage and hold the scale 24. The detent 34 is molded on a cantilever spring section 36 which is formed integrally and co-planar in the back side 14 by a generally U or V-shaped cored-out spring aperture 38.

Opposite to the spring aperture 38 is an opposing aperture 40 through the other or front side 16.

At a relatively central location along the body 12 and pocket 22, and in between the inlet and bottom ends of the pocket 22 are further opposed apertures 42, 44 in the back and front sides 14, 16 respectively for inlet and outlet of air and for stabilizing the position of the pocket 22 during molding.

The holder 10 is particularly well suited for carrying promotion indicia on the front side 16, back side 14 and (he funnel 26 as is shown in FIGS. 1 and 3.

In the alternative preferred embodiment in FIGS. 9 through 15, a writing instrument generally indicated by the numeral 50 is provided and integrated into the holder 10 to form an alternative holder 10A.

The writing instrument 50 includes a cylindrical tube 52 integrated on to one of the right or left sides 18, 20, underneath the funnel 26. Within the tube 52 is a pen, pencil or scribe member 54 that is selectively deployable and/or retractable by a conventional ¼-turn bayonet or other mechanism on a bi-stable retractor mechanism 56.

It can be seen that the pocket 22 is extremely small, long and extremely difficult to fabricate by injection molding and conventional manufacturing techniques. In the preferred method of this invention to mold the holder 10, an injection mold (not shown) is provided with opposed cavity blocks. An elongate mold blade is provided that includes the inside of the funnel 26 and which extends the full length of the pocket 22 and through the bottom aperture 28 and past the cavity for the body 12 and into supporting piloted engagement with the mold cavities, for support of the mold blade on both ends. The mold blade is then firstly supported mid-length by the cores for the spring aperture 38 and the opposing aperture 40, and then secondly by the cores for the further apertures 42, 44. These cores all physically engage the thin blade to hold it in place during injection of molten plastic, to effect molding of a precisely located and very slender elongate scale pocket 22.

Many other advantages, features and additional objects of the present invention will become manifest to those versed in the art upon making reference to the detailed description and accompanying drawings in which the pre(erred embodiment incorporating the principles of the present invention is set forth and shown by way of illustrative example.

Although other advantages may be found and realized and various modifications may be suggested by those versed in this particular art, be it understood that we embody, within the scope of the patent warranted hereon, all such embodiments as reasonably and properly come within the scope of our contribution to this art.

We claim as our invention:

1. An injection molded thermoplastic measuring scale holder comprising
    a) an elongate tubular body having a generally rectangular cross-section and an internal elongate scale pocket having a cross-section which is relatively wide and thin and sized to slip-fit accept a metal measuring scale;
    b) means on said body at an inlet end on said pocket for guiding the scale into said pocket;
    c) a scale stop in said body and at a bottom end of said pocket for vertical support and positioning of the scale in said pocket, said pocket being open past said scale stop to the outside of said bottom end; and
    d) at least one cored aperture through said body and into said pocket, said cored aperture being between said inlet end and said bottom end, and being molded by a core physically positioned to engage and hold a pocket core blade during injection molding of said holder for precisely fixing location of the pocket within the body.

2. The scale holder of claim 1, in which the entirety of said holder is a contiguous single piece of thermoplastic material devised by one mold shot.

3. The scale holder of claim 1, in which said scale stop includes an upward facing ledge in each side of the pocket bottom end.

4. The scale holder of claim 3, in which said pocket opens to the outside between said ledges.

5. The scale holder of claim 1, in which said guiding means is a funnel atop of said body.

6. The scale holder of claim 5, in which said funnel has scale guiding surfaces extending inward to the pocket from both sides and from at least one fore-aft direction.

7. The scale holder of claim 1, including a scale retainer detent secured to said body and facing into said scale pocket, for fictionally engaging and retaining the scale in said pocket.

8. The scale holder of claim 7, in which said detent includes a spring section secured to said body.

9. The scale holder of claim 8, in which said detent is within said core fixing aperture.

10. The scale holder of claim 9, in which said aperture is generally U-shaped.

11. The scale holder of claim 1, including a second said aperture disposed about said pocket in geometric opposition to said one aperture.

12. The scale holder of claim 11, including third and fourth said apertures disposed in geometric opposition to each other, said third and fourth apertures being spaced along said pocket from said first and second apertures.

13. The scale holder of claim 11, including a scale retainer detent in said core fixing aperture.

14. The scale holder of claim 13, in which said detent protrudes into said pocket.

15. The scale holder of claim 1, in which said pocket is open through a bottom opening aperture extending downward past and alongside said scale stop.

16. The scale holder of claim 1, in which said internal wide and thin elongate scale pocket has a length in the range of 4 to 5 inches (100-125 mm) long.

17. The scale holder of claim 1, in which said internal scale pocket has a generally uniform thickness in the range of 0.025 to 0.030 inches (0.62 to 0.75 mm).

18. The scale holder of claim 17, in which said internal scale pocket is at least 4 inches (100 mm) long.

19. The scale holder of claim 1, including writing means on one side of said body for holding a writing instrument.

20. The scale holder of claim 19, in which said writing means is secured at least in part an underside of said guiding means.

21. The scale holder of claim 19, including means adjacent said inlet end for retracting said writing instrument.

22. The scale holder of claim 19, in which said writing instrument is one of a pencil, pen, or scribe.

* * * * *